United States Patent
Hoshii

(10) Patent No.: US 8,690,285 B2
(45) Date of Patent: Apr. 8, 2014

(54) PRINTING APPARATUS AND CALIBRATION METHOD

(71) Applicant: Seiko Epson Corporation, Tokyo (JP)

(72) Inventor: Jun Hoshii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 13/659,083

(22) Filed: Oct. 24, 2012

(65) Prior Publication Data

US 2013/0106935 A1    May 2, 2013

(30) Foreign Application Priority Data

Oct. 28, 2011   (JP) .................................. 2011-236936

(51) Int. Cl.
    *B41J 29/38*    (2006.01)
(52) U.S. Cl.
    USPC .................................. 347/14; 347/15; 347/19
(58) Field of Classification Search
    USPC .......... 347/14, 15, 19, 43, 131, 183; 358/504, 358/514, 518, 521
    See application file for complete search history.

(56) References Cited

U.S. PATENT DOCUMENTS 6,832,825 B1 * 12/2004 Nishikori et al. ................ 347/19
6,871,931 B2 *  3/2005 Kaneko ........................... 347/19

FOREIGN PATENT DOCUMENTS

JP        2008-302521        12/2008

* cited by examiner

*Primary Examiner* — Thinh Nguyen
(74) *Attorney, Agent, or Firm* — Workman Nydegger

(57) ABSTRACT

An optical sensor that outputs a signal based on reflected light intensity is moved in a second direction orthogonal to a transport direction of a medium. A pattern containing patches representing a plurality of gradation levels between a first gradation level and a second gradation level denser than the first is formed such that each patch is located at a different position in the second direction. Signals of the patch of the second gradation level and another patch are outputted. Then signals are outputted with respect to positions in the second direction in a blank region onto which ink has not been dispensed, one of the positions being located at the same position as the patch of the second gradation level, the other position being located at the another patch, so as to correct a dispensing amount corresponding to the gradation level of the another patch.

5 Claims, 11 Drawing Sheets

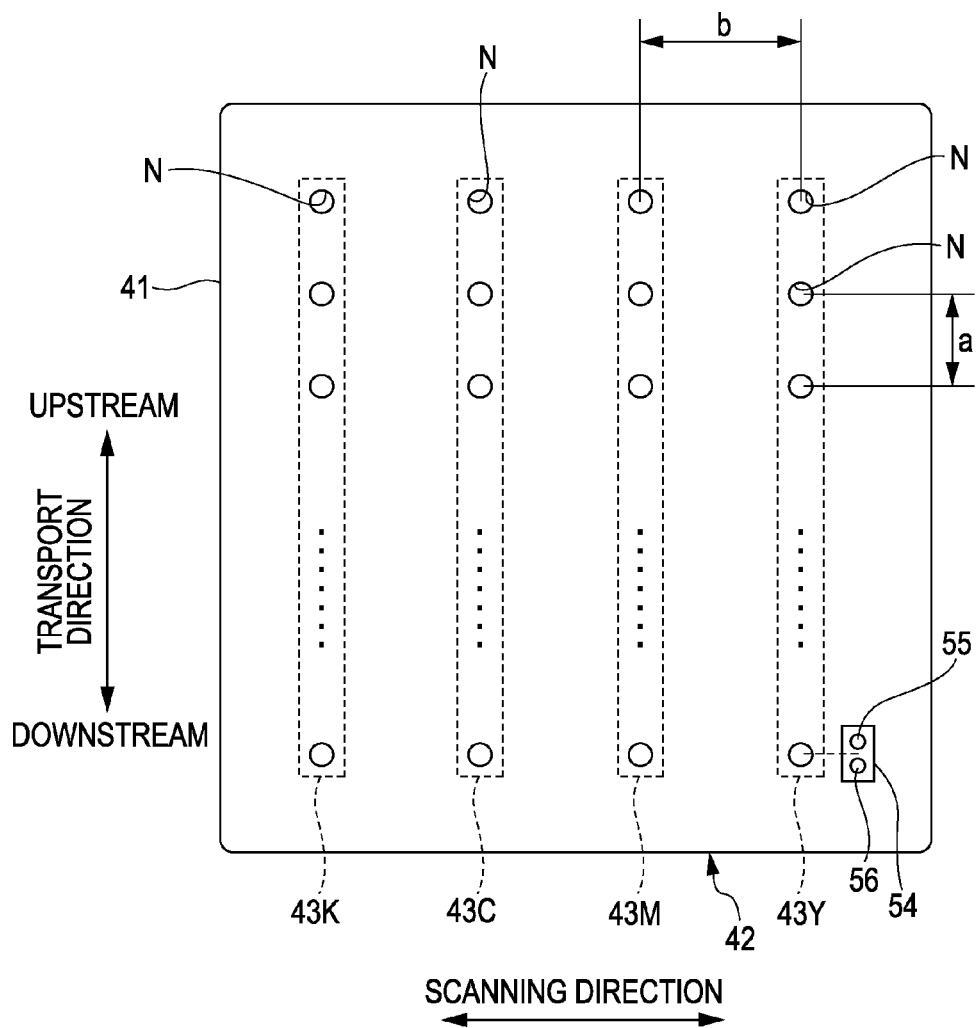

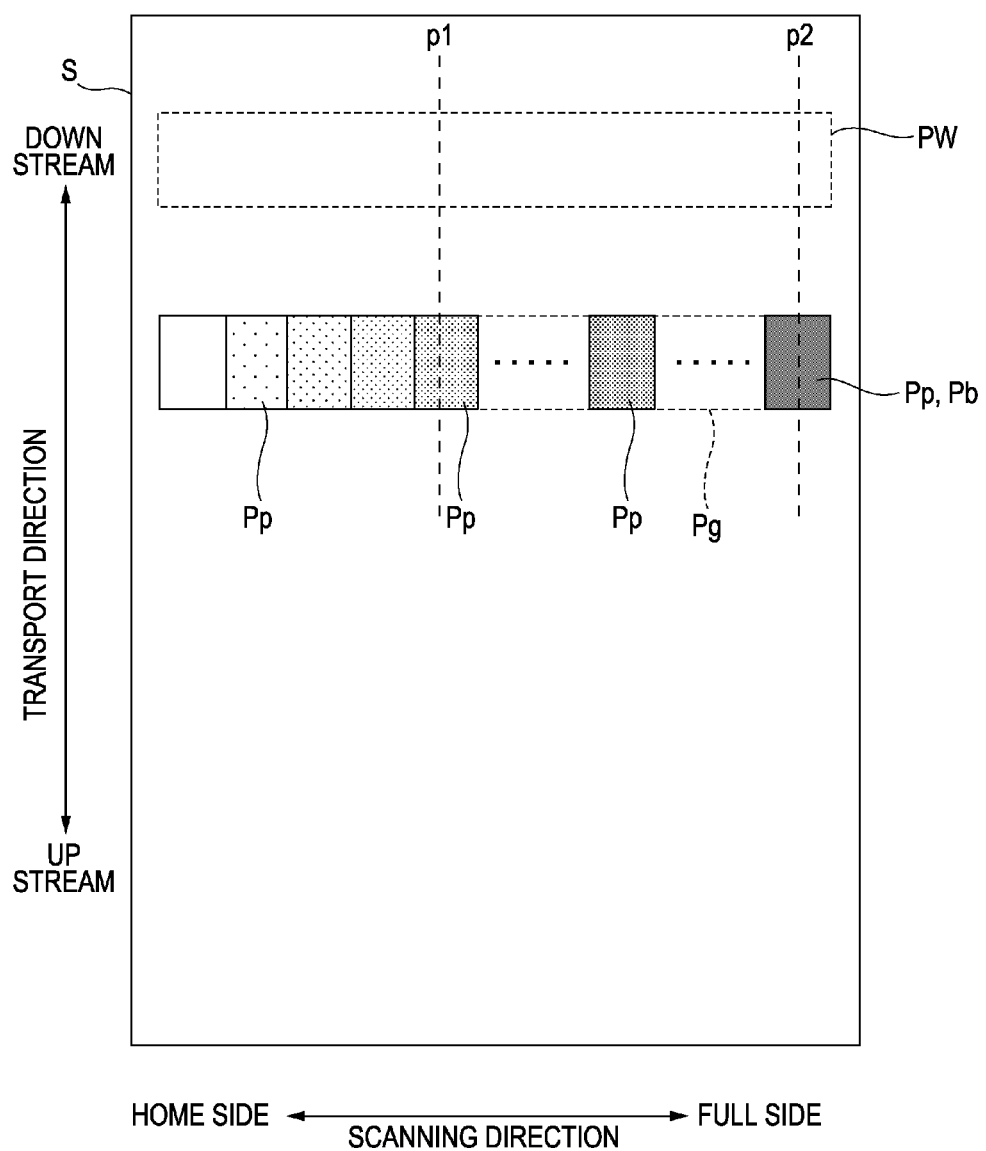

PRINTING APPARATUS AND CALIBRATION METHOD

BACKGROUND

1. Technical Field

The present invention relates to a printing apparatus, and a calibration method to be performed by the printing apparatus.

2. Related Art

Existing printing apparatuses that print images on a medium (paper, cloth, and so forth) are configured to print a pattern composed of a multitude of patches of different gradation levels on the medium, and read out the patches in the pattern with an optical sensor to thereby perform calibration on the basis of the reading result. For example, JP-A-2008-302521 discloses a technique of printing a pattern composed of a multitude of patches of different gradation levels and correcting the gradation level of the image to be printed, on the basis of the density of each patch that has been read, which is known as color calibration.

To perform the color calibration according to JP-A-2008-302521, it is necessary to detect the density of the patches with high accuracy. However, although the patches are printed in the same density, the optical sensor may output different read-out values depending on the position on the medium where the patch is printed. For example, in the case where a distance between a given point on the surface of the medium and the reading position of the optical sensor is different from the preset value, a different read-out value is outputted.

SUMMARY

An advantage of some aspects of the invention is that a printing apparatus that correctly performs color calibration is provided, configured so as to minimize influence of error incidental to detection of patches for color calibration with an optical sensor. In addition, a calibration method to be performed by the printing apparatus is provided. Further advantages will become apparent through subsequent description.

In an aspect, the invention provides a printing apparatus that includes a transport unit that transports a medium in a first direction, a head that dispenses ink while moving in a second direction orthogonal to the first direction, and an optical sensor that emits light on the medium while moving in the second direction and outputs a signal based on intensity of reflected light. The printing apparatus is configured to, when correcting a dispensing amount of the ink by using a patch pattern composed of a patch of a first gradation level, a patch of a second gradation level denser than the first gradation level, and a plurality of patches each presenting a different gradation level between the first gradation level and the second gradation level: form the patch pattern such that the patches are located at different positions in the second direction; output the signal of the patch of the second gradation level and the signal of a patch in the patch pattern other than the patch of the second gradation level, thereby measuring density; output the signal of a position in a blank region on the medium onto which the ink has not been dispensed, the position being located at the same position in the second direction as the patch of the second gradation level, and the signal of a position in the blank region located at the same position in the second direction as the patch other than the patch of the second gradation level, thereby measuring medium density; output the signal on the assumption that the patch of the second gradation level is formed at the position of the patch other than the patch of the second gradation level, on the basis of the signals outputted in the measuring of the density and in the measuring of the medium density, thereby predicting density; and correct the dispensing amount corresponding to the gradation level of the patch other than the patch of the second gradation level, on the basis of the signal outputted in the predicting of density.

Other features and advantages of the invention will become more apparent through the description given hereunder with reference to the accompanying drawings.

BRIEF DESCRIPTION OF THE DRAWINGS

The invention will be described with reference to the accompanying drawings, wherein like numbers reference like elements.

FIG. 3 is a plan view showing an arrangement of nozzles on the lower face of a head mounted in the printing apparatus.

FIG. 9 is a schematic plan view showing a patch formed on a medium, to be used in the gradation calibration method according to the first inventive example.

DESCRIPTION OF EXEMPLARY EMBODIMENTS

Embodiments

Figure 1:
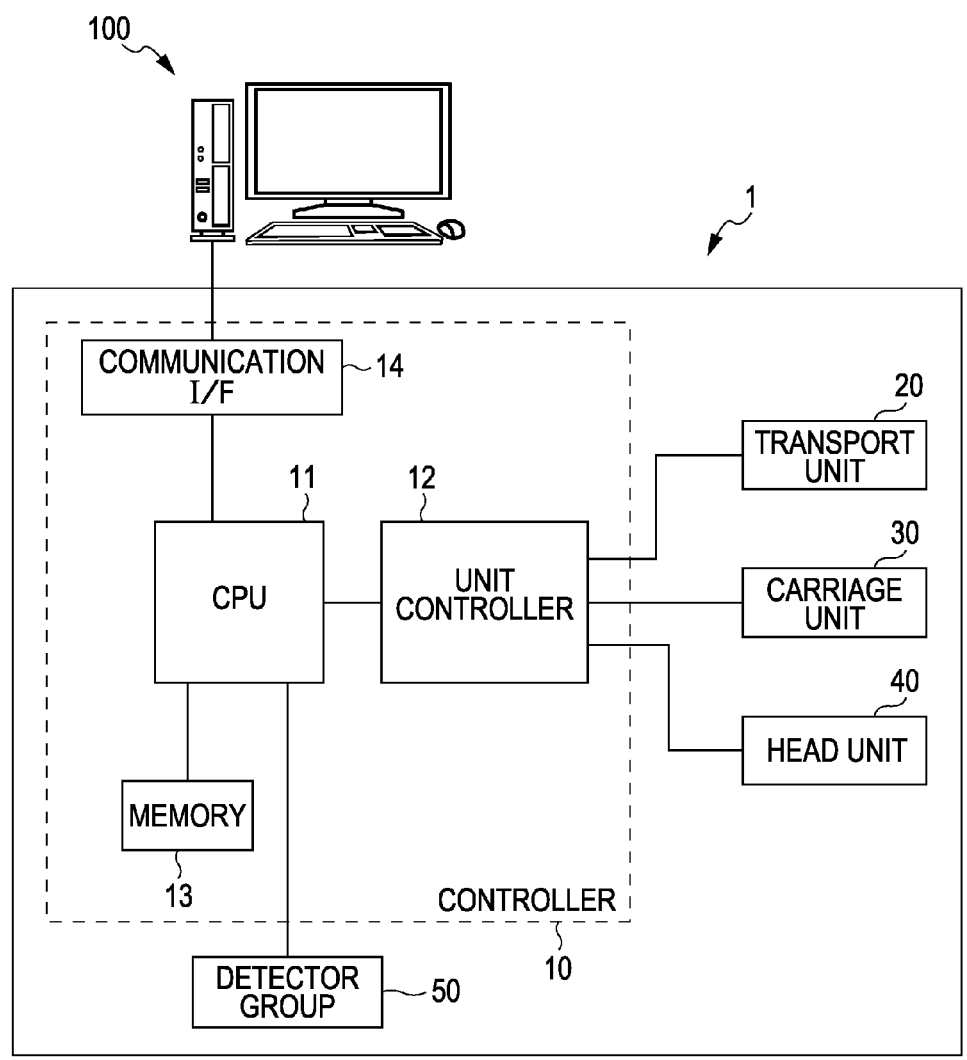
FIG. 1 is a block diagram showing a general configuration of a printing apparatus.

In addition to the configuration according to the foregoing paragraph, the invention may be embodied as exemplified below.

The patch of the first gradation level, the plurality of patches of different gradation levels, and the patch of the second gradation level may be sequentially aligned in this order in the second direction, in the pattern.

A plurality of the patterns may be formed in the first direction, the blank region may be interposed between the patterns adjacent to each other among the plurality of the patterns, and the signal outputted in the measuring of the medium density utilized for predicting the density may be the signal of the blank region adjacent to the pattern with respect to which the signal for measuring the density utilized for predicting the density has been outputted.

The patch of the first gradation level and the patch of the second gradation level may each be wider in the first direction than a width of a detection region to be read by a photodetector of the optical sensor in the first direction and wider in the second direction than a width of the detection region in the second direction, and the plurality of patches of different gradation levels may each be wider in the first direction than the width of the detection region in the first direction but narrower in the second direction than the width of the detection region in the second direction.

Another embodiment of the invention is a method of correcting an amount of ink dispensed by a head, by using a patch pattern composed of a patch of a first gradation level, a patch of a second gradation level denser than the first gradation level, and a plurality of patches each presenting a different gradation level between the first gradation level and the second gradation level. The method includes forming the patch pattern such that the patches are located at different positions in a second direction orthogonal to a first direction in which a medium is transported by the head, outputting, by using an optical sensor that emits light to the medium and outputs a signal based on intensity of reflected light, the signal of the patch of the second gradation level and the signal of a patch in the patch pattern other than the patch of the second gradation level, thereby measuring density; outputting, by using the optical sensor, the signal of a position of a blank region on the medium onto which the ink has not been dispensed, the position being located at the same position in the second direction as the patch of the second gradation level, and the signal of a position of the blank region located at the same position in the second direction as the patch other than the patch of the second gradation level, thereby measuring medium density; outputting the signal on the assumption that the patch of the second gradation level is formed at the position of the patch other than the patch of the second gradation level, on the basis of the signals outputted in the measuring of the density and in the measuring of the medium density, thereby predicting density; and correcting the dispensing amount corresponding to the gradation level of the patch other than the patch of the second gradation level, on the basis of the signal outputted in the predicting of density.

Basic Structure and Operation of Printing Apparatus

Figure 2A:
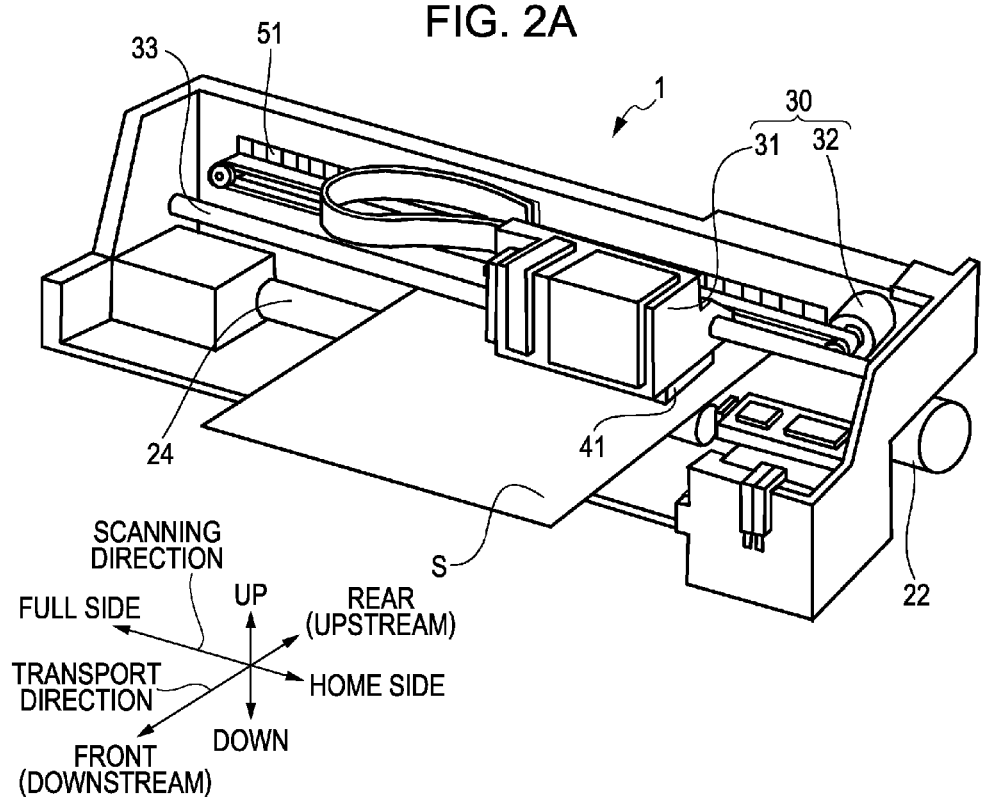
FIGS. 2A and 2B are a perspective view and a side view, respectively, showing the outline of the internal structure of the printing apparatus.
Figure 2B:
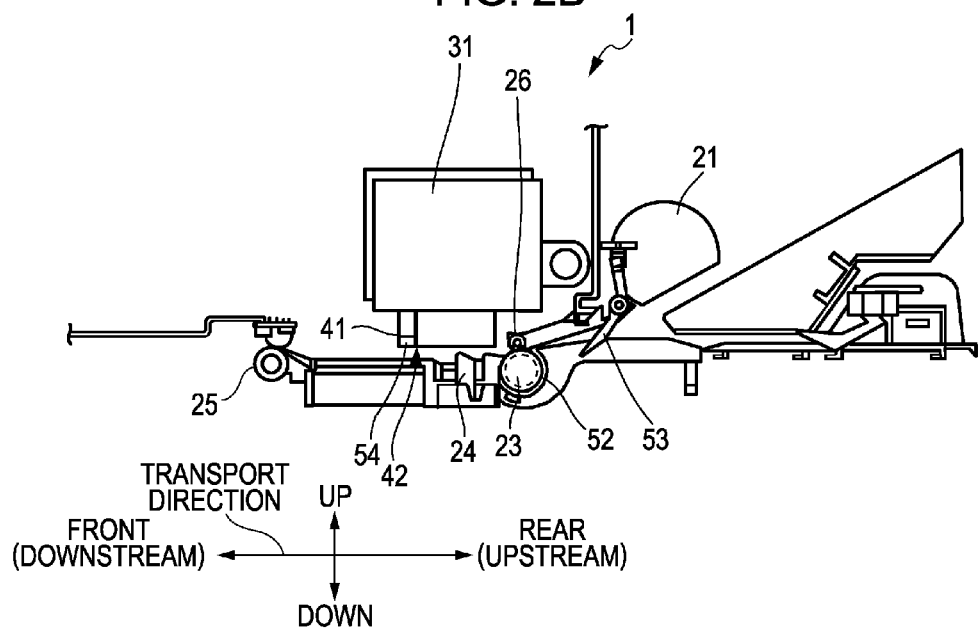

FIG. 1 is a functional block diagram of a printing apparatus 1 according to this embodiment. FIGS. 2A and 2B illustrate an outline of the internal structure of the printing apparatus 1, FIG. 2A being a perspective view and FIG. 2B being a side view thereof. The printing apparatus 1 essentially includes a controller 10, a transport unit 20, a carriage unit 30, a head unit 40, and a detector group 50.

The controller 10 substantially serves to control the printing apparatus 1, and includes a CPU 11 which is an arithmetic processing unit, a unit controller 12 that controls the aforementioned units (20, 30, 40) and the detector group 50 in accordance with a command from the CPU 11 and that transfers data outputted by those units (20, 30, 40) and the detector group 50 to the CPU 11, a memory 13 that serves as a storage region of programs to be executed by the CPU 11 and an operating region for executing the programs, and a communication interface (I/F) unit 14 for intermediation of data communication between a computer 100, which is an external apparatus, and the CPU 11.

The transport unit 20 serves to transport a medium S such as a paper sheet in a first direction (hereinafter, transport direction). Here, the transport direction will be defined such that the side from which the medium S is supplied is the upstream side and the side to which the medium S is delivered is the downstream side, and relative up-and-down direction in the printing apparatus 1 will be defined such that the surface of the medium S on which an image is formed is the upper or front surface. The transport unit 20 includes a paper feed roller 21, a transport motor 22, a transport roller 23, a platen 24, and a delivery roller 25. The paper feed roller 21 serves to transport the medium S supplied from the upstream side outside the printing apparatus 1 into inside the printing apparatus 1. The transport roller 23 is driven by the transport motor 22, so as to pinch the medium S together with a slave roller 26 and transport the medium S supplied by the paper feed roller 21 to the region where printing is to be performed.

The platen 24 serves to support from below the medium S during the printing operation. The delivery roller 25 is located downstream of the region where the printing is to be performed in the transport direction, and rotates in synchronization with the transport roller 23 so as to deliver the medium S to outside of the printing apparatus 1.

The carriage unit 30 serves to move a carriage 31 in a second direction (hereinafter, scanning direction) orthogonal to the transport direction in a horizontal plane, the carriage 31 including therein a head 41 having nozzles through which the ink is dispensed. The carriage 31 is driven by a carriage motor 32 so as to reciprocate in the scanning direction along a carriage guide shaft 33. In this embodiment, in addition, inks of different colors (cyan C, magenta M, yellow Y, and black K) for multi-color printing are loaded in an ink cartridge 34, which is removably attached to the carriage 31.

The carriage 31 remains at a stand-by position on an end portion in the scanning direction while the printing apparatus 1 is not executing the printing operation, and reciprocates in the scanning direction over a predetermined range while the printing operation is being performed. Hereafter, the end portion of the travel range of the carriage 31 corresponding to the stand-by position will be referred to as home side, and the opposite end portion will be referred to as full side. In this embodiment, the home side is located on the right in the scanning direction, when viewed from the downstream side.

The detector group 50 includes sensors for detecting various states in the printing apparatus 1, and the sensors of the detector group 50 each output a detection result (detection data) to the controller 10. In this embodiment, the detector group 50 includes a linear encoder 51 that detects the position of the carriage 31 in the scanning direction, a roller rotary encoder 52 that detects the rotation amount of the transport roller 23, a medium detection sensor 53 that detects the position of the leading edge of the medium S being transported, and an optical sensor 54 mounted on the lower face 42 of the head 41.

The head unit 40 including the head 41 as its main component is configured to dispense ink droplets onto the medium S. As shown in FIG. 3, the head 41 includes a plurality of nozzles N formed on the lower face 42. The nozzles N are openings aligned in the transport direction at regular intervals "a", so as to form nozzle rows (43C, 43M, 43Y, 43K) each corresponding to one of the colors cyan C, magenta M, yellow Y, and black K. The nozzle rows (43C, 43M, 43Y, 43K) are aligned in the scanning direction at regular intervals "b", and the nozzle rows (43C, 43M, 43Y, 43K) each correspond to a different color. The nozzles N are each provided with an ink chamber and a piezoelectric element (neither shown). When the piezoelectric element is driven so as to expand and contract the ink chamber, the ink droplet is dispensed through the nozzle N. Accordingly, the head unit 40 also includes a circuit for driving the head 41 and the piezoelectric element. The thus-configured head 41 reciprocates interlockedly with the carriage 31 in the scanning direction, and intermittently dispenses the ink droplets during the reciprocating motion so as to form dot lines (luster lines) in the scanning direction on the front surface of the medium S.

As stated above, the optical sensor 54 is mounted on the lower face 42 of the head 41. The optical sensor 54 includes a light source 55 that illuminates the front surface of the medium S and a photodetector 56 that detects the light reflected by the medium S and outputs a signal in accordance with the intensity of the reflected light. The optical sensor 54 is located so as to correspond to the nozzle N at the most downstream position in the transport direction. Thus, when a region on the medium S where an image has been formed by the upstream nozzles N reaches the downstream side in a printing operation performed while the medium S is transported from the upstream side toward the downstream side, the optical sensor 54 configured as above can continuously detect in the scanning direction, along with the travel of the head 41 in the scanning direction, the intensity of the reflected light from the region where the image has been formed. In other words, the formation of the image and the detection of the reflected light intensity can be performed in parallel, without the need to reverse the transport direction.

The printing apparatus 1 configured as above dispenses, in accordance with the gradation level of each color transmitted from the computer 100, a predetermined amount of ink droplet of a predetermined color onto a predetermined region having a predetermined area on the medium S corresponding to a specific pixel, to thereby form an image on the medium S.

Necessity of Color Calibration

Even among the printing apparatuses 1 of the same model, the printing characteristics (density, value, chroma, hue, and so forth) may vary depending on the individual difference of the head 41. In addition, the printing characteristics may fluctuate with time in each of the printing apparatuses 1. Accordingly, the printing apparatus 1 is given a color calibration function including forming on the medium S a pattern composed of a plurality of patches each corresponding to one of different gradation levels, detecting a difference, with respect to each gradation level, between the expected density of the patch (expected value) and the density of the patch actually formed on the medium S (measured value), and correcting the ink dispensing amount so as to minimize the difference.

Outline of Color Calibration

The color calibration employs a pattern composed of a patch of a first gradation level, another patch of a second gradation level denser than the first gradation level, and a plurality of patches each presenting a different gradation level between the first gradation level and the second gradation level, for correcting the dispensing amount of the ink. For example, the color calibration may be performed as follows. First, a multitude of patches of different gradation levels are formed on the medium S with respect to the respective ink colors utilized by the printing apparatus 1 (for example, C, M, Y, K), and the optical sensor 54 detects the intensity of the reflected light from each of the patches. Then a difference (error) between the measured value obtained from the detected value and the expected value is calculated with respect to each of the patches, and the gradation level and the amount of ink to be actually dispensed are corrected on the basis of the calculated error. More specifically, the correction is made such that the measured value of the patch on the medium S agrees with the expected value, with respect to a predetermined gradation level.

Figure 4:
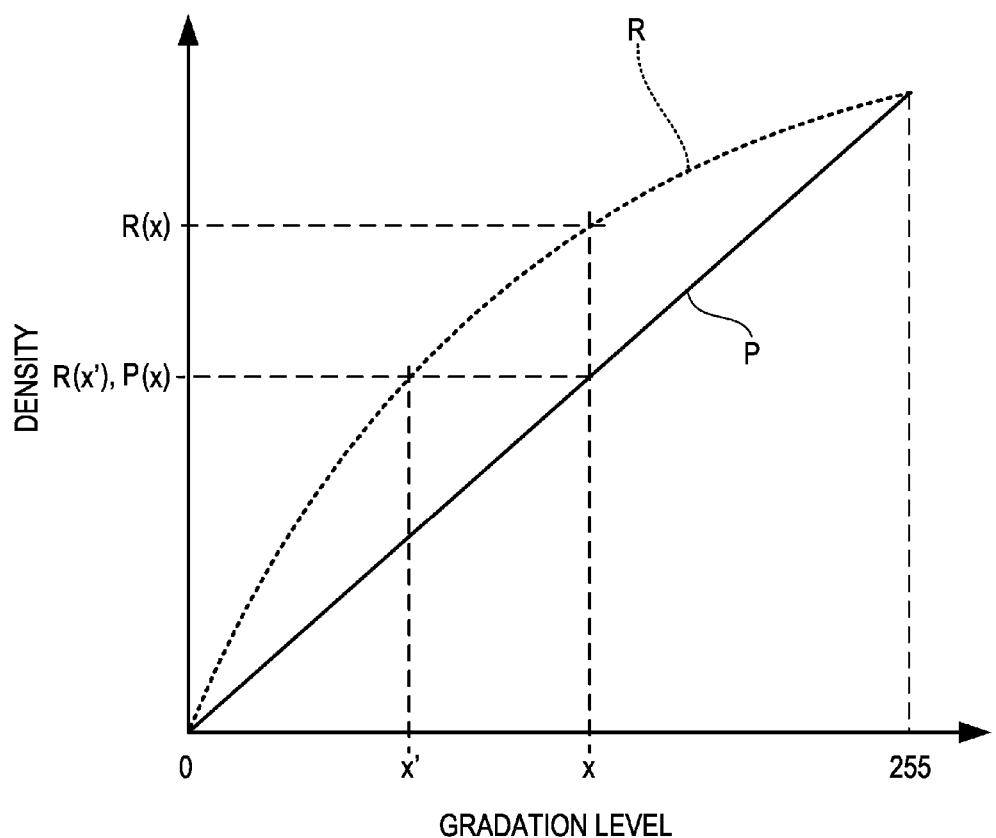
FIG. 4 is a graph for explaining the principle of color calibration.

FIG. 4 schematically represents the principle of the color calibration. In this embodiment, it will be assumed that the density is expressed by 256 gradation levels from 0 to 255, and the characteristic of the expected value of each gradation level (expected value characteristic) is expressed by a straight line P. The first gradation level is defined as a gradation level corresponding to the case where no ink droplet is dispensed (corresponding to the gradation level 255). In other words, the density of the first gradation level is the density of the medium S itself (hereinafter, paper-white). The second gradation level is defined as the density corresponding to the case where a pixel is fully painted with an ink droplet of a specific color (hereinafter, 100% solid corresponding to the gradation level 0). The plurality of gradation levels between the first gradation level and the second gradation level correspond to all the gradation levels or a plurality of discrete gradation levels between the paper-white and the 100% solid. Here, provided that the second gradation level is denser than the first gradation level, the first gradation level or the second gradation level do not have to be paper-white or 100% solid, respectively.

By a conventional color calibration method (hereinafter, conventional example), a pattern composed of patches each corresponding to one of the plurality of gradation levels from the first gradation level to the second gradation level (in this paragraph, from paper-white to 100% solid) is actually formed, and each of the patches corresponding to all the gradation levels or discrete gradation levels is read by an optical sensor, to thereby obtain a relationship between the gradation level and the density of the patch actually formed on the medium S (measured value characteristic R), on the basis of the read value. Here, the measured value characteristic R is normalized by, for example, defining the measured value corresponding to the paper-white as 0 and the measured value of 100% solid as 1, in consideration of the individual difference of the optical sensor and temporal fluctuation.

Then with respect to a measured value $R(x)$ obtained from a certain gradation level x, the expected value of that gradation level x being $P(x)$, a gradation level x' corresponding to a measured value $R(x')$ that agrees with $P(x)$ is determined on the basis of the measured value characteristic R, so as to form the image with the density corresponding to the gradation level x', when the gradation level x is given. Thus, agreement is established between the expected value $P(x)$ and the measured value $R(x)$.

Drawback of Conventional Example

As described above, the color calibration can make the expected value and the measured value agree with each other. Now, whereas the multitude of patches of different densities are formed on the medium S in the color calibration according to the conventional example, actually an error may be incurred on the measured value of a patch depending on the position where the patch is formed, despite the patch having been formed on the basis of the same gradation level.

For example, because of fluctuation in assembling accuracy of the printing apparatus 1 and machining accuracy of the parts constituting the printing apparatus 1, the clearance between the sensing face of the optical sensor 54, i.e., the lower face 42 of the head 41 and the front surface of the medium S may be different depending on the position of the medium S. In this case, a patch of the same density may be measured as presenting different density depending on the position where the patch is formed. As a specific example, in the case where the respective end portions of the carriage guide shaft 33 or the platen 24 are at difference levels in height, the clearance between the front surface of the medium S and the lower face of the head (platen gap) on the home side becomes different from that of the full side, and hence the measured value becomes different between the home position and the full position, despite the patch presenting the same density. This is because the intensity of the light from the optical sensor reflected by the medium S is attenuated when the platen gap is wider, and hence a measured value indicating a higher density than the actual one is obtained. On the contrary, when the platen gap is narrower the reflected light intensity is increased, so that the measured value indicates a lower density.

Color Calibration Taking Patch Position into Account

Figure 5:
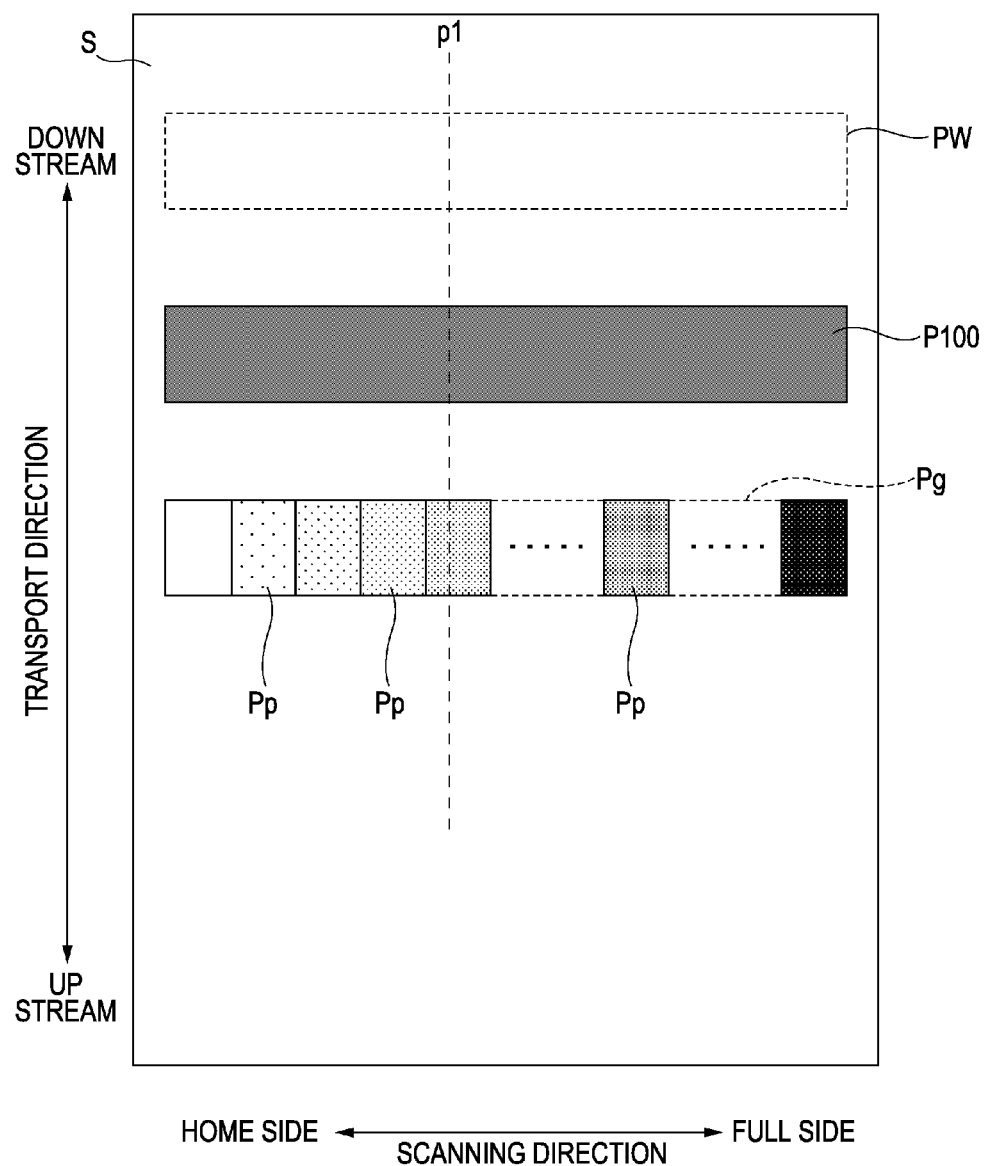
FIG. 5 is a schematic plan view showing a strip-shaped pattern to be read by an optical sensor when color calibration is performed taking a difference in height between platen gaps in the printing apparatus.

As described above, the color calibration according to the conventional example has the drawback in that an error may be incurred in the measured value of a patch depending on the position where the patch is formed, despite the patch having been formed on the basis of the same gradation level. Accordingly, the following color calibration method is popularly adopted for minimizing the foregoing drawback (hereinafter, comparative example 1). FIG. 5 is a schematic drawing for explaining the color calibration method according to the comparative example 1. In the comparative example 1, as shown in FIG. 5, a strip-shaped patch of 100% solid (hereinafter, strip-shaped solid) P100 and a strip-shaped gray scale pattern (hereinafter, gray scale pattern) Pg are formed on the medium S so as to extend in the scanning direction and to be aligned parallel to each other in the transport direction. The gray scale pattern Pg is composed of strip-shaped patches Pp aligned in the scanning direction, each presenting a different gradation level such that the gradation level sequentially increases from the home position toward the full position, in other words such that the density gradually varies in the scanning direction. In the patches Pp, therefore, each position in the scanning direction is associated with a respectively predetermined gradation level.

In addition, a blank region PW extending in the scanning direction is defined by designating a portion of the paper-white region as the blank region. Then the density of paper-white is measured at predetermined positions in the blank region PW in the scanning direction, and further the density of the strip-shaped solid P100 is measured at predetermined positions, while moving the carriage 31 in the scanning direction. As a result, the densities of paper-white and 100% solid are identified at the respective positions in the scanning direction.

In addition, the carriage 31 is driven in the scanning direction to thereby measure the density of the gray scale pattern Pg at the respective positions. This measurement allows the correspondence between the gradation level and the measured value of the density of the patch Pp presenting that gradation level to be obtained, on the basis of the correspondence established in advance between the position in the scanning direction and the gradation level. Further, the range of the measured density value of paper-white and 100% solid is normalized with respect to a specific position p1, and the normalized measured value of the patch Pp corresponding to the position p1 is obtained. Likewise, the range of the measured value of paper-white and 100% solid is normalized with respect to the remaining positions, and the normalized measured value of the patch Pp of the gradation level corresponding to each of the positions is obtained. Thus, the normalization is performed at the respective positions in the scanning direction, so that the measured value characteristics independent from the position of the patch Pp can be obtained. Since the optical sensor 54 detects the reflected light intensity of the respective positions in the scanning direction while the head 41 is driven in the scanning direction, naturally it is not necessary to transport the medium S in the reverse direction after completely forming the strip-shaped patterns (P100, Pg), so as to scan on the already formed strip-shaped patterns (P100, Pg) for reading the density. In other words, the formation of the strip-shaped patterns (P100, Pg) and detection of the density can be performed at the same time. In addition, it is to be noted that the strip-shaped solid P100, the gray scale pattern Pg, and the patches Pp in the gray scale pattern Pg are illustrated in enlarged sizes in FIG. 5, for the sake of better visual understanding.

Cockling

The color calibration method according to the comparative example 1 shown in FIG. 5 can minimize the disadvantage incidental to the position of the patches, despite the difference in platen gap due to the fluctuation in mechanical accuracy of the printing apparatus 1. Yet, the color calibration method according to the comparative example 1 still has a room for improvement. Since the strip-shaped solid P100 has to be widely formed in the scanning direction, a large amount of ink is concentratedly dispensed onto the predetermined strip-shaped region on the medium S. Accordingly, the large amount of ink may soak into the medium S so as to swell the same, thereby incurring a phenomenon generally called cockling, depending on the type of the medium S. In this case, the density becomes uneven at some positions in the scanning direction because of the cockling, which is a factor different from the platen gap. Thus, the fluctuation of the clearance between the front surface of the medium S and the sensing face of the optical sensor 54 originates not only from the difference in platen gap due to the fluctuation in mechanical accuracy of the printing apparatus 1, but also from the cockling of the medium S. Moreover, the fluctuation of the clearance due to the cockling takes place in short and irregular periods at various positions in the scanning direction, unlike the difference in platen gap between the home side and the full side, which simply defines a linear difference in height. Accordingly, although the normalization is performed upon measuring the density of paper-white and 100% solid at the predetermined positions in the scanning direction, the range of the numerical value representing the density of paper-white and 100% solid, which serves as the basis of the normalization, becomes largely different each time the calibration is performed, because of the irregular clearance due to the cockling. The following inventive example represents, therefore, a method for accurately performing the color calibration (hereinafter, simply calibration method) arranged so as to minimize both the uneven density originating from the difference in platen gap due to fluctuation in mechanical accuracy of the printing apparatus 1 and the uneven density originating from the cockling of the medium S.

First Inventive Example

A first inventive example is based on the following fundamental principle of the calibration method, for minimizing both the uneven density originating from the difference in platen gap due to fluctuation in mechanical accuracy of the printing apparatus 1 and the uneven density originating from the cockling of the medium S.

Measurement of Density

Figure 6:
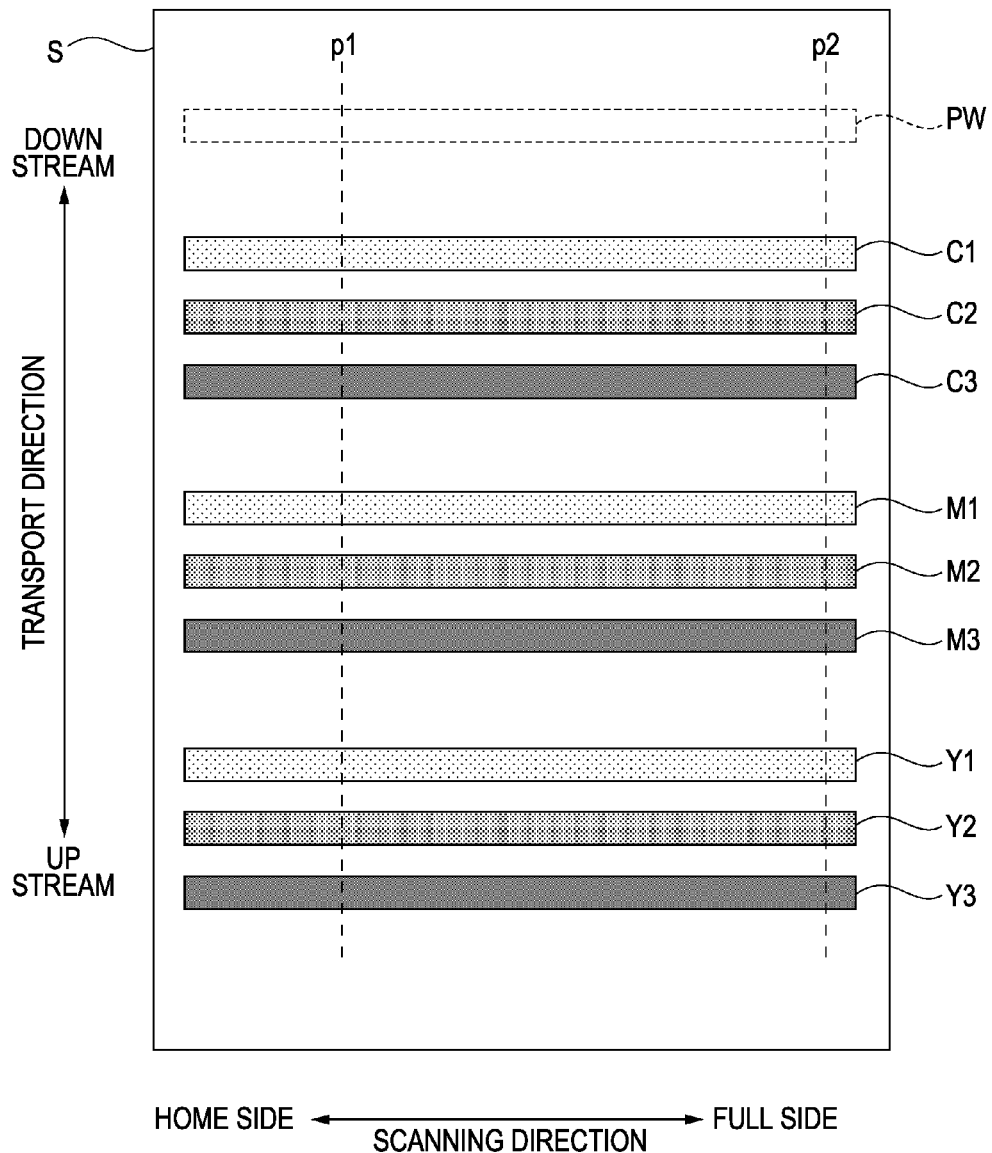
FIG. 6 is a schematic plan view showing a strip-shaped pattern to be read by the optical sensor to confirm an effect of a gradation calibration method according to a first inventive example.

The comparative example 1 represents a color calibration method based on the actually measured values of the density of the patches formed on the predetermined positions on the medium S. This method may therefore be evaluated as accurate provided that the cockling does not take place. Accordingly, the difference will be observed between the correction effect obtained by the calibration method according to the comparative example 1 and the correction effect obtained by the calibration method according to the first inventive example. For this purpose, the printing apparatus 1 was adjusted such that the platen gap on the full side became wider than on the home side by 150 μm, and a plurality of strip-shaped patterns were formed on a medium S of a type that was resistant against cockling. FIG. 6 schematically depicts the medium S on which the strip-shaped patterns (cyan C1 to C3, magenta M1 to M3, and yellow Y1 to Y3) were formed. The strip-shaped patterns (C1 to C3, M1 to M3, and Y1 to Y3) are each formed in densities corresponding to the same gradation level in the scanning direction and, in this example, strip-shaped solids (C3, M3, Y3) and two strip-shaped patterns representing gradation levels in two halftones (C1 and C2, M1 and M2, and Y1 and Y2; hereinafter, strip-shaped halftone pattern) were formed with respect to each of cyan, magenta, and yellow. In other words, three patterns per color, totally nine strip-shaped patterns were formed. Then the density was measured at the predetermined positions in the scanning direction on a blank region PW representing paper white and the strip-shaped patterns (C1 to C3, M1 to M3, and Y1 to Y3).

Figure 7:
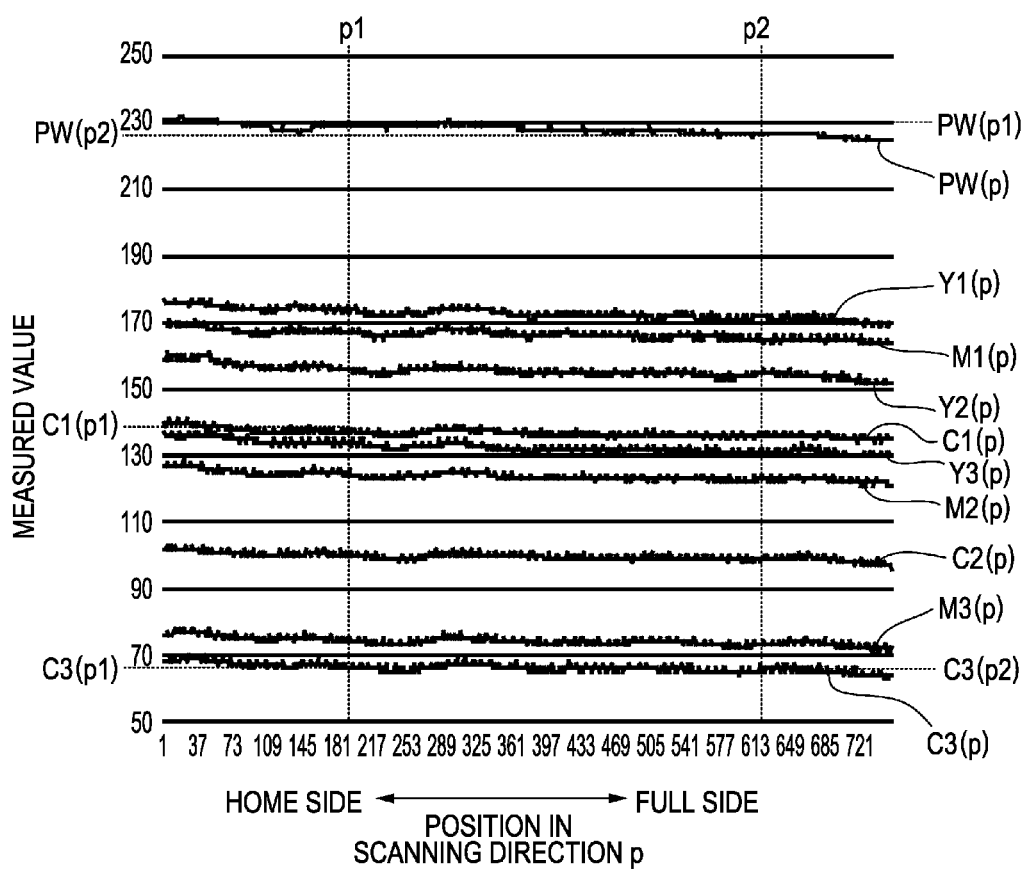
FIG. 7 is a diagram showing a relationship between a position of a measurement point and a measured value of density, with respect to the strip-shaped pattern shown in FIG. 6.

FIG. 7 shows a curved line PW(p) representing the correspondence between the positions p in the scanning direction and the measured values of the density in the blank region PW, and curved lines (C1($p$) to C3($p$), M1($p$) to M3($p$), and Y1($p$) to Y3($p$)) representing the correspondence between the positions p in the scanning direction and the measured values of the density on the strip-shaped patterns (C1 to C3, M1 to M3, and Y1 to Y3). The measured values were based on the intensity of the reflected light detected by the optical sensor 54 at totally 753 positions designated at regular intervals in the scanning direction in the printable region on the medium S, from a position 0 at the extremity on the home side to a position 752 at the extremity on the full side. The horizontal axis of the graph of FIG. 7 represents the measurement points and the vertical axis represents the measured values of the blank region PW and the strip-shaped patterns (C1 to C3, M1 to M3, and Y1 to Y3). Since the platen gap on the full side is wider than on the home side, the reflected light intensity is attenuated on the full side, and therefore, as shown in FIG. 7, the curved line PW(p) corresponding to the blank region PW and the curved lines (C1($p$) to C3($p$), M1($p$) to M3($p$), and Y1($p$) to Y3($p$)) corresponding to the respective strip-shaped patterns (C1 to C3, M1 to M3, Y1 to Y3) are generally linearly inclined downward to the right, and the inclination of the respective curves lines is generally the same.

Then the gradation levels were corrected by the calibration method according to the comparative example 1 and the calibration method according to the first inventive example, with respect to the measured values of the blank region PW and the strip-shaped patterns (C1 to C3, M1 to M3, and Y1 to Y3) shown in FIG. 6. Referring to FIGS. 6 and 7, the correction process according to the respective calibration methods will be described here below.

Correction Process According to Comparative Example 1

By the calibration method according to the comparative example 1, the density of paper white at a given measurement point on the blank region PW, and the densities at the same measurement point on the 100% solid strip-shaped pattern (C3, M3, Y3) and the strip-shaped halftone patterns (C1 and C2, M1 and M2, and Y1 and Y2) of each color were measured, to thereby identify the normalized density characteristic R as shown in FIG. 4 on the basis of those measured values. Here, the curved line C1($p$) corresponding to the strip-shaped halftone pattern C1 representing cyan C representing a given gradation level will be taken up as an example. When a given measurement point on the blank region PW is denoted as p1; the density of paper-white at the measurement point p1 is denoted as PW(p1); the density at the measurement point p1 on the strip-shaped solid C3 of cyan C is denoted as C3 (p1); and the measured value at the measurement point p1 on the strip-shaped halftone pattern C1 is denoted as C1 (p1), the normalized value $R_{C1}$(p1) of the measured value C1($p$1) of halftone may be expressed as follows:

$$R_{C1}(p1)=\{C1(p1)-C3(p1)\}/\{PW(p1)-C3(p1)\}.$$

Thus, the respective densities of paper-white, 100% solid, and halftone are measured at the same measurement point p1, and the density of halftone is normalized on the basis of such a measured value. However, as already stated, although the correction accuracy can be improved with the color calibration method according to the comparative example 1, this method requires forming the strip-shaped solid C3 and the strip-shaped halftone pattern C1, which may incur the problem originating from the cockling, depending on the type of the medium S. Even though the cockling may not take place, this method is not free from the drawback of excessive consumption of the ink and the medium S.

Correction Process According to First Inventive Example

The color calibration method according to the first inventive example will now be described. Basically, the first inventive example predicts, on the basis of a signal outputted by the optical sensor 54 representing the density of 100% solid at a predetermined position in the scanning direction and a signal representing the density of paper-white at the same position, a signal that may be outputted in the case where the optical sensor 54 detects a patch of 100% solid formed at a position other than the predetermined position. Hereunder, further details will be described with reference to the curved line C1($p$) corresponding to the strip-shaped halftone pattern C1.

Utilizing the result shown in FIG. 7, namely the fact that the curved line PW(p) corresponding to the blank region PW and the curved lines (C1($p$) to C3($p$), M1($p$) to M3($p$), and Y1($p$) to Y3($p$)) of the measured values corresponding to the strip-shaped patterns (C1 to C3, M1 to M3, and Y1 to Y3) have generally the same inclination, in the first inventive example the density characteristic R is identified on the basis of a paper-white measured value PW(p1) at a given measurement point p1, a paper-white measured value PW(p2) at a specific measurement point p2, a measured value C3($p$2) at the specific measurement point p2 on the strip-shaped solid C3, and a measured value C1($p$1) at the given measurement point p1 on the strip-shaped halftone pattern C1.

To be more detailed, a measured value C3($p$1) at the measurement point p1 on the strip-shaped solid C3 is estimated on the basis of the two paper-white measured values PW(p1) and PW(p2) at the measurement points p1 and p2 and the measured value C3($p$2) at the measurement point p2 on the strip-shaped solid C3, in accordance with the following equation 1. In other words, a predicted value C3'(p1) of C3($p$1) is calculated.

$$C3'(p1)=\{PW(p1)-PW(p2)\}+C3(p2) \qquad \text{[Equation 1]}$$

Then a normalized value $R'_{C1}$(p1) of the measured value of the strip-shaped halftone pattern C1 is calculated on the basis of the predicted value C3'(p1), the measured value C1($p$1) at the measurement point p1 on the strip-shaped halftone pattern C1, and the paper-white measured value PW(p1) on the measurement point p1.

$$R'_{C1}(p1)=\{C1(p1)-C3'(p1)\}/\{PW(p1)-C3'(p1)\} \qquad \text{[Equation 1]}$$

Comparative Example 2

In the first inventive example, as described above, the predicted value C3'(p1) at the measurement point p1 on the strip-shaped solid C1 is calculated. To verify the unique effect of the first inventive example, a comparative example 2 will be cited here below which represents a calibration method including normalizing the measured value C1($p1$) on the basis of the paper-white measured value PW($p1$) at the measurement point p1, measured value C1($p1$) at the same measurement point p1 on the strip-shaped halftone pattern C1, and the measured value C3($p2$) at the specific measurement point p2 on the strip-shaped solid C3, without calculating the predicted value C3'(p1) at the measurement point p1 on the strip-shaped solid C1. In other words, the color calibration method according to the comparative example 2 adopts the following equation for obtaining a normalized value R'$_{C1}$(p1) of the measured value C1($p1$) at the measurement point p1 on the strip-shaped halftone pattern C1.

$$R'_{C1}(p1)=\{C1(p1)-C3(p2)\}/\{PW(p1)-C3(p2)\}$$

Correction Effect of Comparative Example 1, First Inventive Example, and Comparative Example 2

Figure 8A:
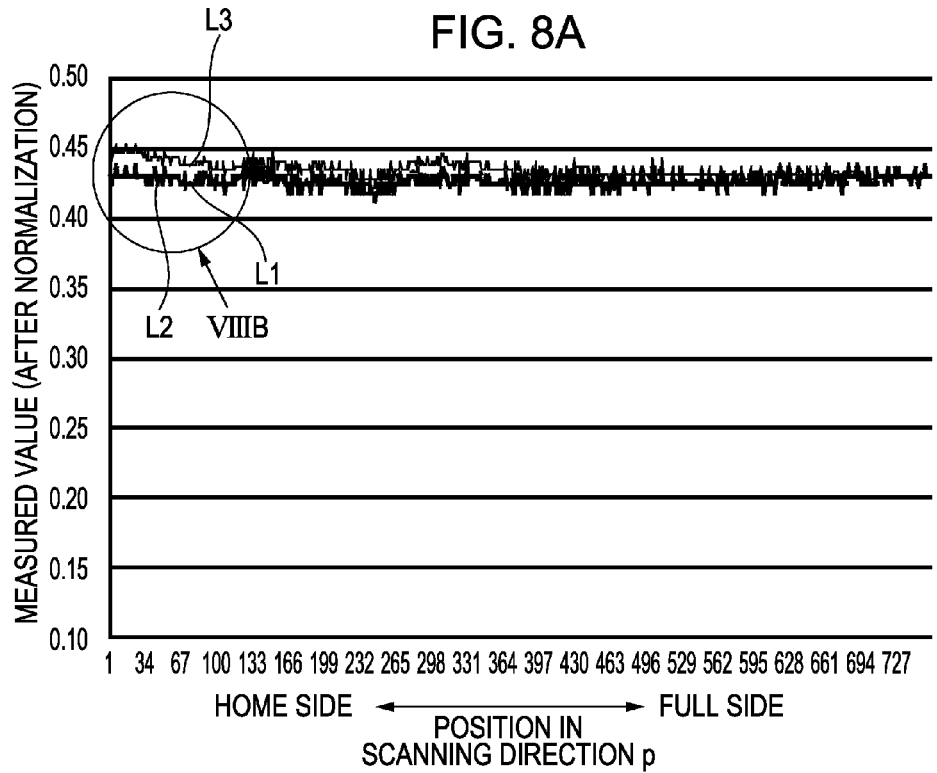
FIG. 8A is a graph showing the effect of the gradation calibration method according to the first inventive example.
Figure 8B:
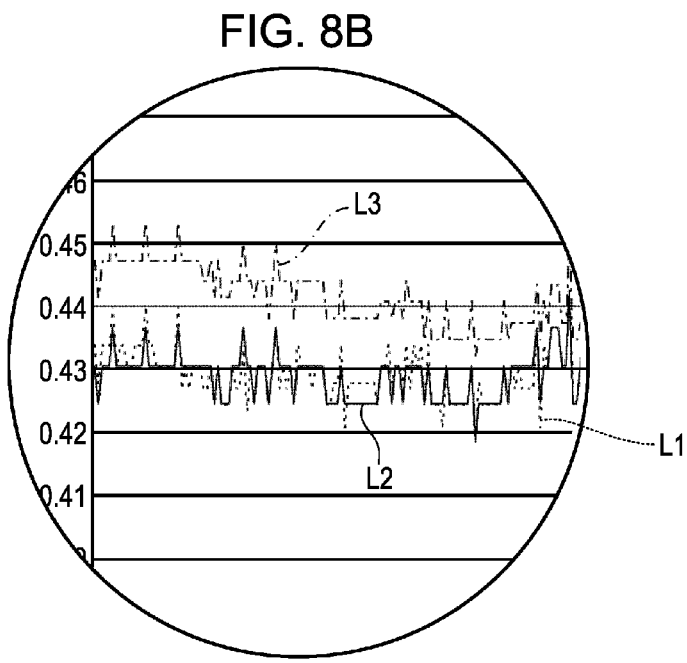
FIG. 8B is an enlarged view of a circled portion VIIIB in FIG. 8A.

FIGS. 8A and 8B show differences in correction effect among the calibration methods according to the comparative example 1, the first inventive example, and the comparative example 2. In FIG. 8A, the horizontal axis represents the measurement points p on a strip-shaped halftone pattern C1 drawn with an ink of cyan C, and the vertical axis represents the normalized values based on the measured values at each of the measurement points p on the strip-shaped pattern C1, obtained by the method according to the conventional example, the comparative example, and the first inventive example. Accordingly, the graph shown in FIG. 8A is equivalent to obtaining a point R(x) on the density characteristic curve R corresponding to a gradation level x of the strip-shaped pattern C1 shown in FIG. 4, with respect to each of the measurement points. Here, in the first inventive example and the comparative example, the density of 100% solid at a specific measurement point is an average value of the densities measured at 20 successive measurement points toward the home side from the specific measurement points. In addition, the graph shown in FIG. 8A represents a general tendency of the correction effects obtained by the respective calibration methods, and FIG. 8B is an enlarged view of a circled portion VIIIB in FIG. 8A.

As shown in FIG. 8A, the curved line L3 corresponding to the comparative example 2 assumes higher values than the remaining curved lines (L1, L2) on the home side, and is downwardly inclined to the right. This verifies that the calibration method according to the comparative example 2 is affected by the mechanical accuracy of the printing apparatus 1, because of measuring the 100% solid density only at the specific measurement point p2. In other words, the calibration method according to the comparative example 2 is affected by the difference in platen gap between the home side and the full side. The calibration method according to the comparative example 2 is, therefore, unable to realize accurate color calibration.

In contrast, the curved lines L1 and L2 corresponding to the comparative example 1 and the first inventive example, respectively, are generally horizontal from the home side to the full side, and the loci of the curved lines (L1, L2) generally coincide to such an extent that the curved lines cannot be definitely distinguished in the graph shown in FIG. 8A. From the enlarged view of the circled portion shown in FIG. 8B also, it is understood that the curved line L1 corresponding to the comparative example 1 drawn in broken lines and the curved line L2 corresponding to the first inventive example drawn in solid lines are quite approximate to each other.

As described above, by the calibration method according to the comparative example 1 the measured value characteristic R shown in FIG. 4 is obtained on the basis of the actually measured value. To be more detailed, the densities of paper-white and 100% solid are measured at all the measurement points in the scanning direction, and also the density of the patch of a specific gradation level formed at a specific measurement point. Accordingly, although the platen gap is different depending on the position in the scanning direction, the normalized value of the specific measurement point is not affected by the difference in plate gap because the normalization is performed on the basis of the densities of paper-white and 100% solid measured at the same measurement point as the specific measurement point where the patch of the specific gradation level is formed. In addition, the calibration according to the comparative example 1 employs the medium S of a type that barely suffers cockling, which further ensures the accuracy of the calibration method according to the comparative example 1.

Now, as shown in FIGS. 8A and 8B, the first inventive example has provided substantially the same result as the comparative example 1 which has been proven to be accurate. Moreover, with the calibration method according to the first inventive example, which is based on the advantage that the blank region PW of the medium S is intrinsically free from the cockling since the ink is not dispensed thereonto, the density is measured at all the measurement points in the blank region PW but it suffices to measure the density of 100% solid at a desired position, provided that the position of the target measurement point is known.

FIG. 9 is a schematic plan view showing patches formed on the medium S to be used in the calibration method according to the first inventive example. In the first inventive example, it is not necessary to form the strip-shaped solid P100 which is indispensable in the comparative example 1, but it suffices to define the blank region PW representing paper-white and extending in the scanning direction and to form a 100% solid patch Pb of a size readable by the optical sensor 54 at a desired position on the medium S and patches Pp of predetermined halftones at a desired position. The example shown in FIG. 9 includes a gray scale pattern Pg composed of the patches Pp aligned in the scanning direction so as to sequentially represent different gradation levels from the home position toward the full position, and the patch located at an extremity of the gray scale pattern Pg (full-side end in FIG. 9) is formed as the 100% solid patch Pb.

The example shown in FIG. 9 may be applied to the aforementioned equations 1 and 2 as described here below. With the equation 1, first, the measured value C3'(p1) of the density of the 100% solid patch is predicted on the assumption that the 100% solid patch is formed at the position p1 in the scanning direction which is different from the position p2, on the basis of the measured value C3($p2$) of the density of the 100% solid patch Pb formed at the position p2, the measured value PW(p2) of the paper-white density at the same position p2 in the blank region PW, and the measured value PW(p1) of the paper-white density at the position p1 in the blank region PW. Then with the equation 2, the normalized value R'$_{C1}$(p1) of the measured value C1($p1$) corresponding to the patch Pp formed at the position p1 in the gray scale pattern Pg is obtained on the basis of the measured value C1($p1$) of the density of the patch Pp formed at the position p1, the measured value PW(p1) of the paper-white density at the position p1, and the measured value C3'(p1) of the density of the 100% solid patch obtained by the equation 1.

It is a matter of course that the plurality of patches Pp each corresponding to a different gradation level and the 100% solid patch Pb may be formed at different positions. In any case, in the first inventive example it is not necessary to form the strip-shaped solid P100, which may provoke the cockling, and therefore accurate color calibration can be performed irrespective of the type of the medium S. In other words, in the case where the color calibration is performed on a medium S that is likely to suffer the cockling, the first inventive example provides a more accurate calibration result than the comparative example 1.

Figure 10:
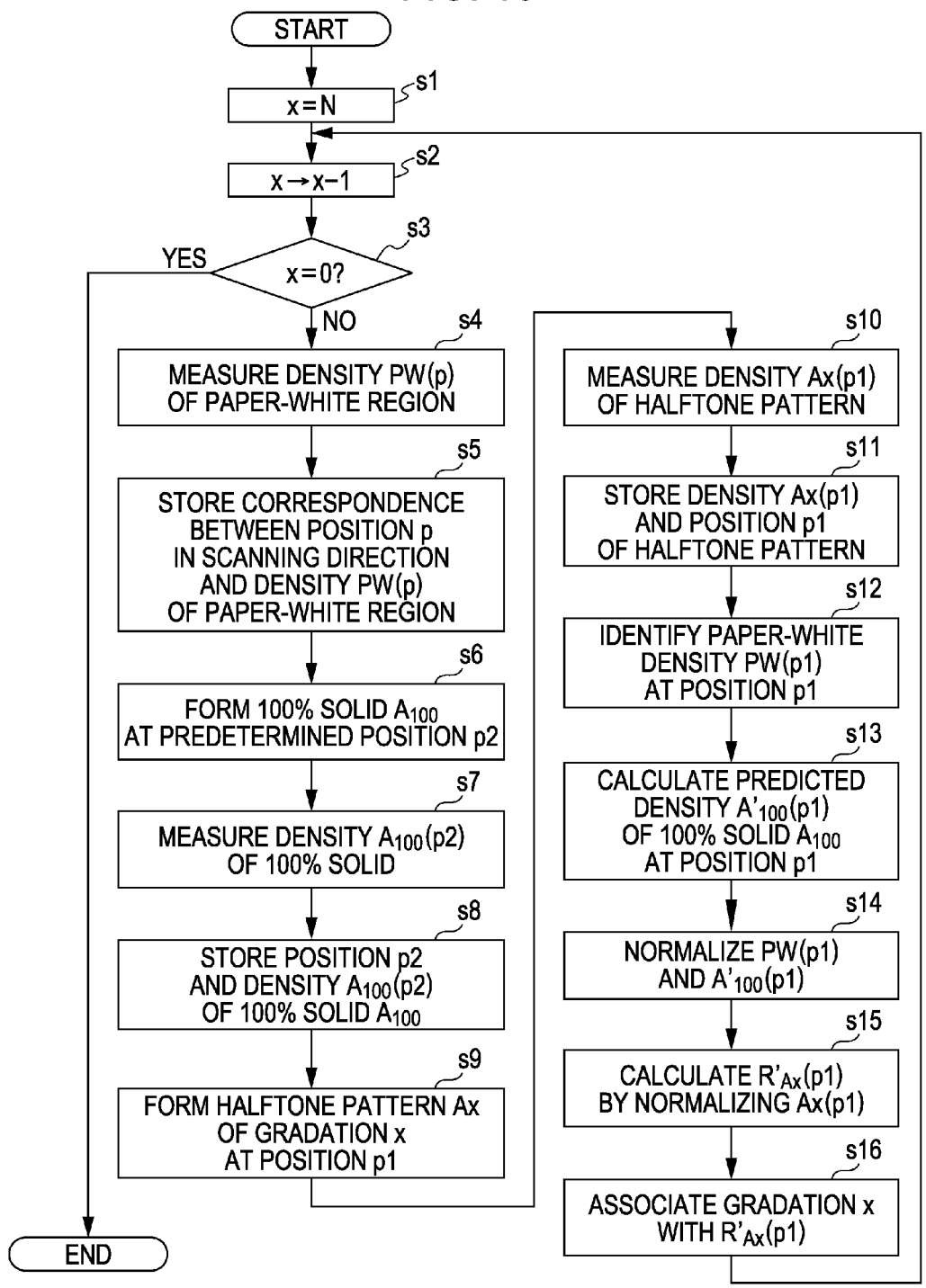
FIG. 10 is a flowchart showing steps of the gradation calibration method according to the first inventive example.

Information Processing in Color Calibration According to First Inventive Example FIG. 10 is a flowchart showing steps of the calibration method according to the first inventive example, in the form of an information processing flow executed by the controller 10. The flowchart represents a color calibration process with respect to a patch Ax of a given color (A) of a given gradation level (x). The gradation level of paper-white is denoted as N (s1), and the gradation levels are set from 0 to N. First, the gradation level is gradually lowered from paper-white (s2), and paper-white density PW(p) is measured at all the measurement points p unless the gradation level corresponds to 100% solid (s3 to s4), and paper-white measured values PW(p) of the respective measurement points p are stored (s5).

Then a 100% solid patch ($A_{100}$) is formed at a desired position p2 and the density thereof $A_{100}$(p2) is measured (s6, s7), and the position p2 and the measured value $A_{100}$(p2) are stored (s8). The patch Ax of the density corresponding to the gradation x specified at step s2 is formed on the medium S and the density of the patch Ax is measured (s9, s10), and then the position p2 and the density Ax(p2) are stored (s11). At this stage, the data necessary for normalizing the density of the given gradation x is obtained.

On the basis of the correspondence with the measured value PW(p) of the paper-white density at the respective positions p in the scanning direction stored at step s5, paper-white density Pw(p1) at the position p1 where the patch Ax of the gradation level x is provided is acquired (s12). Further, on the assumption that 100% solid $A_{100}$ is formed at the same position p1, a predicted value $A'_{100}$(p1) of the density of the imaginary 100% solid $A_{100}$ is identified in accordance with the foregoing equation 1 (s13). Then the numerical ranges of the paper-white density PW(p1) and the predicted value $A'_{100}$(p1) of 100% solid at the position p1 are normalized (s14), to thereby obtain a normalized value $R'_{Ax}$(p1) of the measured value Ax(p1) of the density corresponding to the gradation level x in accordance with the foregoing equation 2 (s15). The gradation level x and the normalized value $R'_{Ax}$(p1) of the density are then stored in association with each other. In this way, the correspondence between the density and the relevant position of a patch of a given gradation level is stored with respect to all the gradation levels (s16 to s2, s3 to end). At this stage, the measured value characteristic R as shown in FIG. 4 is obtained. Then finally, correction is performed such that the measured value characteristic R and the expected value characteristic P agree with each other, in other words such that the actual density R(x) of the patch formed at the gradation level x agrees with the expected value P(x).

Second Inventive Example

As described above, the first inventive example represents a color calibration method arranged so as to minimize the impact of a difference in platen gap originating from fluctuation in assembling accuracy of the printing apparatus 1 and machining accuracy of the parts, as well as that originating from the cockling effect, and allows accurate color calibration to be performed irrespective of the difference in platen gap whatever the cause thereof may be. Now, the sensing region (detection spot) of the optical sensor 54 is, for example, a circular region of several millimeters in diameter, and in the printing apparatus 1 according to this embodiment the detection spot of the optical sensor 54 has a diameter of 8 mm. Accordingly, when forming the gray scale pattern on the medium S to perform the color calibration by the method according to the first inventive example, each patch contained in the gray scale pattern has to be made larger than the detection spot. In this case, the patches of all the gradation levels cannot be formed in a single gray scale pattern and hence a plurality of gray scale patterns of different gradation level ranges have to be formed in the transport direction. Therefore it takes a long time to perform the color calibration since the densities of the patches contained in each of the plurality of gray scale patterns have to be measured. In addition, naturally, a large amount of ink is consumed to form the plurality of gray scale patterns. Further, a larger space on the medium S has to be allocated, or a larger-sized medium S has to be employed, for forming the plurality of gray scale patterns to provide the patches of all the gradation levels, which leads to increased consumption of the medium S. In view of the above, a second inventive example will be described hereunder, which represents a calibration method that allows the density measurement time to be shortened and the consumption of the ink and medium S to be reduced, by rearranging the size and shape of the gray scale pattern and the patches contained therein corresponding to the respective gradation levels specified in the gray scale pattern.

Figure 11A:
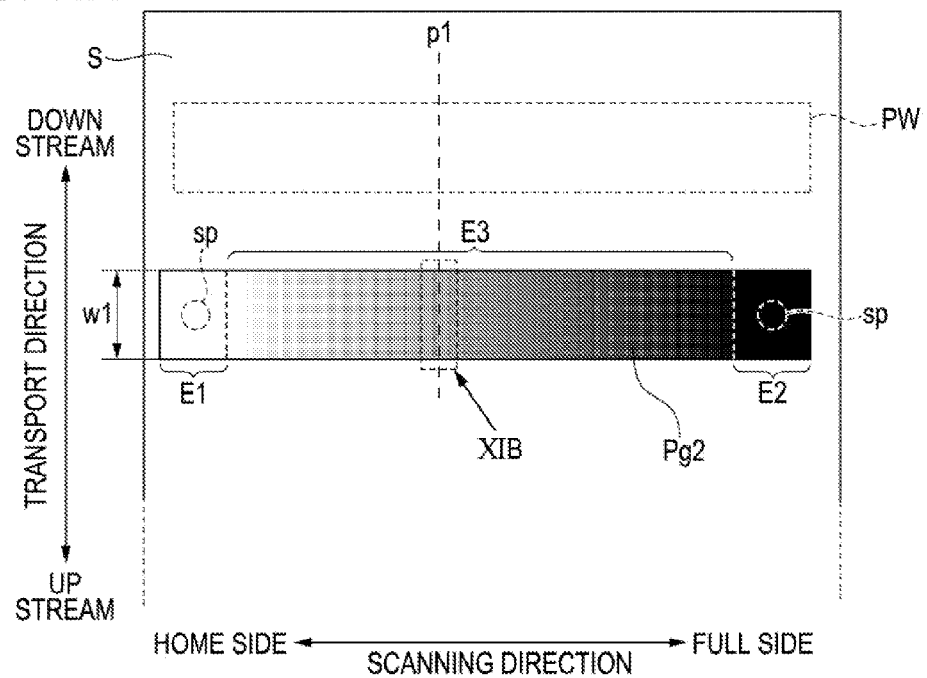
FIG. 11A is a schematic plan view showing a strip-shaped gray scale pattern formed on the medium by a gradation calibration method according to a second inventive example.
Figure 11B:
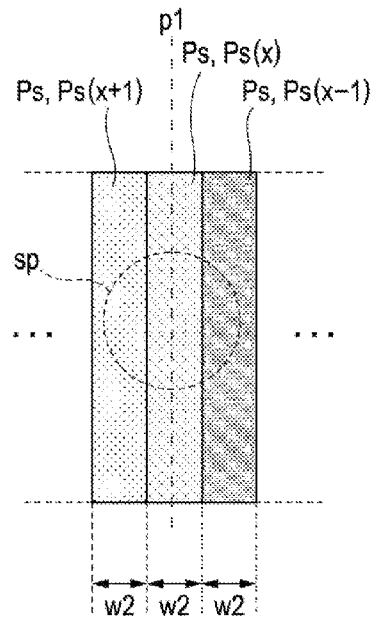
FIG. 11B is an enlarged view of a region XIB shown in FIG. 11A.

FIGS. 11A and 11B depict a gray scale pattern Pg2 to be formed on the medium S in the second inventive example. FIG. 11A shows the overall appearance of the gray scale pattern Pg2, and FIG. 11B is an enlarged view of a portion of an intermediate region XIB in FIG. 11A. The gray scale pattern Pg2 has a width w1 in the transport direction that is wider than the width of a detection spot sp in the transport direction, and includes regions E1, E2 larger than the detection spot sp, provided at the respective end portions. The region E1 on one of the end portions represents paper-white, and the region E2 on the other end portion represents 100% solid. In this example, the region E1 representing paper-white corresponds to the home side, and the region E2 representing 100% solid corresponds to the full side. The intermediate region XIB of the gray scale pattern Pg2 is, as shown in FIG. 11B, composed of a multitude of slit-shaped patches Ps, each having a width w2 in the scanning direction narrower than the detection spot sp of the optical sensor 54, and the slit-shaped patches Ps each represent the density corresponding to the gradation level and are aligned such that the density gradually increases from the home side toward the full side. Accordingly, adjacent to a slit-shaped patch Ps(x) representing a gradation level x on the home side, a slit-shaped patch Ps(x+1) representing a gradation level x+1 is provided, and a slit-shaped patch Ps(x−1) representing a gradation level x−1 is provided adjacent to the slit-shaped patch Ps(x) on the full side.

In the second inventive example, the slit-shaped patch Ps(x) representing the gradation level x is narrower than the detection spot sp of the optical sensor 54. In other words, the sensing region within which the optical sensor 54 is capable of detecting the intensity of reflected light protrudes from the slit-shaped patch Ps(x). However, on the respective sides of the slit-shaped patch Ps(x) representing the gradation level x, the slit-shaped patch Ps(x+1) representing the gradation level x+1 less dense than the gradation level x and the slit-shaped patch Ps(x−1) representing the gradation level x−1 denser than the gradation level x are provided. Therefore, the optical sensor 54 can output a value substantially equivalent to the density of the slit-shaped patch Ps(x) representing the gradation level x, despite the detection spot sp of the optical sensor 54 protruding from the slit-shaped patch Ps(x).

Thus, according to the second inventive example, the patches Ps representing all the gradation levels necessary for the color calibration can be included in a single gray scale pattern Pg2, and the densities of the patches of all the gradation levels can equally be identified. Such an arrangement allows the consumption of the ink and the medium S for the color calibration to be reduced, and the execution time of the color calibration to be shortened.

Additional Inventive Examples

Although the paper-white measured values are identified with respect to all the measurement points in the scanning direction in the first and the second inventive example, the intensity of reflected light in the paper-white region may be discretely detected at a plurality of measurement points, to thereby identify the correspondence between the respective positions in the scanning direction and the paper-white density by interpolating values between the actually measured values. Likewise, the patches may also be formed so as to correspond to discrete gradation levels instead of all the gradation levels, to thereby identify the measured value characteristic of all the gradation levels by interpolating values between the actually measured values of the discrete gradation levels.

Although the first inventive example represents the case of the gradation calibration with respect to the specific color cyan C, actually the color calibration is performed with respect to all the ink colors employed in the printing apparatus 1, and therefore a plurality of gray scale patterns of the respective colors have to be formed in parallel in the transport direction, even in the case of performing the color calibration by the method according to the second inventive example. In this case, the correspondence between the measurement point and the measured value may be identified with respect to only the blank region extending in a strip shape in the scanning direction, however the optical sensor 54 may suffer temporal fluctuation of the characteristics depending on the continuous working time.

For example, the characteristics may fluctuate owing to the heat generated by the optical sensor 54 itself or changes in temperature inside the printing apparatus 1. Accordingly, in the case where a certain time lag is present between the measurement of the gray scale patterns of the respective colors and the measurement of the blank region, the patches of the same density may be measured as representing a different density, which leads to failure to perform accurate color calibration.

Therefore, the blank regions extending in a strip shape in the scanning direction may be defined between the gray scale patterns, and the correspondence between the measurement point and the measured value may be identified utilizing the blank region adjacent to the gray scale pattern of the color to be calibrated. Such an arrangement allows the measurement of the blank region and the gray scale pattern to be performed in a shorter time, thereby suppressing the fluctuation in characteristics of the optical sensor 54 to a minimal level.

Although the correspondence between the density and the gradation level is corrected through a single session of color calibration in the foregoing inventive examples, the color calibration may be again performed utilizing halftone patches formed on the basis of the correspondence between the density and the gradation level obtained after the correction, so as to make the measured value characteristic shown in FIG. 4 more approximate to the expected value characteristic.

Although the foregoing inventive examples primarily represent the printing apparatus 1 having an optical sensor and the color calibration method to be performed by the printing apparatus 1, those examples also refer to a printing method, methods of forming the patches, and the configuration and arrangement of the patches. It is to be understood that the foregoing inventive examples are intended for better understanding of the invention and not for limiting the invention. The invention may be modified or improved within the scope thereof, and the invention also encompasses the equivalents thereof.

The entire disclosure of Japanese Patent Application No. 2011-236936, filed Oct. 28, 2011 is expressly incorporated by reference herein.

What is claimed is:

1. A printing apparatus, comprising:
   a transport unit that transports a medium in a first direction;
   a head that dispenses ink while moving in a second direction orthogonal to the first direction; and
   an optical sensor that emits light on the medium while moving in the second direction and outputs a signal based on intensity of reflected light,
   the printing apparatus being configured to, when correcting a dispensing amount of the ink by using a patch pattern composed of a patch of a first gradation level, a patch of a second gradation level denser than the first gradation level, and a plurality of patches each presenting a different gradation level between the first gradation level and the second gradation level:
   form the patch pattern such that the patches are located at different positions in the second direction;
   output the signal of the patch of the second gradation level and the signal of a patch in the patch pattern other than the patch of the second gradation level, thereby measuring density;
   output the signal of a position in a blank region on the medium onto which the ink has not been dispensed, the position being located at the same position in the second direction as the patch of the second gradation level, and the signal of a position in the blank region located at the same position in the second direction as the patch other than the patch of the second gradation level, thereby measuring medium density;
   output the signal on the assumption that the patch of the second gradation level is formed at the position of the patch other than the patch of the second gradation level, on the basis of the signals outputted in the measuring of the density and in the measuring of the medium density, thereby predicting density; and
   correct the dispensing amount corresponding to the gradation level of the patch other than the patch of the second gradation level, on the basis of the signal outputted in the predicting of density.

2. The printing apparatus according to claim 1,
   wherein the patch of the first gradation level, the plurality of patches of different gradation levels, and the patch of the second gradation level are sequentially aligned in this order in the second direction, in the pattern.

3. The printing apparatus according to claim 2,
   wherein a plurality of the patterns are formed in the first direction,
   the blank region is interposed between the patterns adjacent to each other among the plurality of the patterns, and the signal outputted in the measuring of the medium density utilized for predicting the density is the signal of the blank region adjacent to the pattern with respect to which the signal for measuring the density utilized for predicting the density has been outputted.

4. The printing apparatus according to claim 2,
wherein the patch of the first gradation level and the patch of the second gradation level are each wider in the first direction than a width of a detection region to be read by a photodetector of the optical sensor in the first direction and wider in the second direction than a width of the detection region in the second direction, and the plurality of patches of different gradation levels are each wider in the first direction than the width of the detection region in the first direction but narrower in the second direction than the width of the detection region in the second direction.

5. A method of correcting an amount of ink dispensed by a head, by using a patch pattern composed of a patch of a first gradation level, a patch of a second gradation level denser than the first gradation level, and a plurality of patches each presenting a different gradation level between the first gradation level and the second gradation level, the method comprising:

forming the patch pattern such that the patches are located at different positions in a second direction orthogonal to a first direction in which a medium is transported by the head;

outputting, by using an optical sensor that emits light to the medium and outputs a signal based on intensity of reflected light, the signal of the patch of the second gradation level and the signal of a patch in the patch pattern other than the patch of the second gradation level, thereby measuring density;

outputting, by using the optical sensor, the signal of a position of a blank region on the medium onto which the ink has not been dispensed, the position being located at the same position in the second direction as the patch of the second gradation level, and the signal of a position of the blank region located at the same position in the second direction as the patch other than the patch of the second gradation level, thereby measuring medium density;

outputting the signal on the assumption that the patch of the second gradation level is formed at the position of the patch other than the patch of the second gradation level, on the basis of the signals outputted in the measuring of the density and in the measuring of the medium density, thereby predicting density; and correcting the dispensing amount corresponding to the gradation level of the patch other than the patch of the second gradation level, on the basis of the signal outputted in the predicting of density.

* * * * *